Fig. 6.

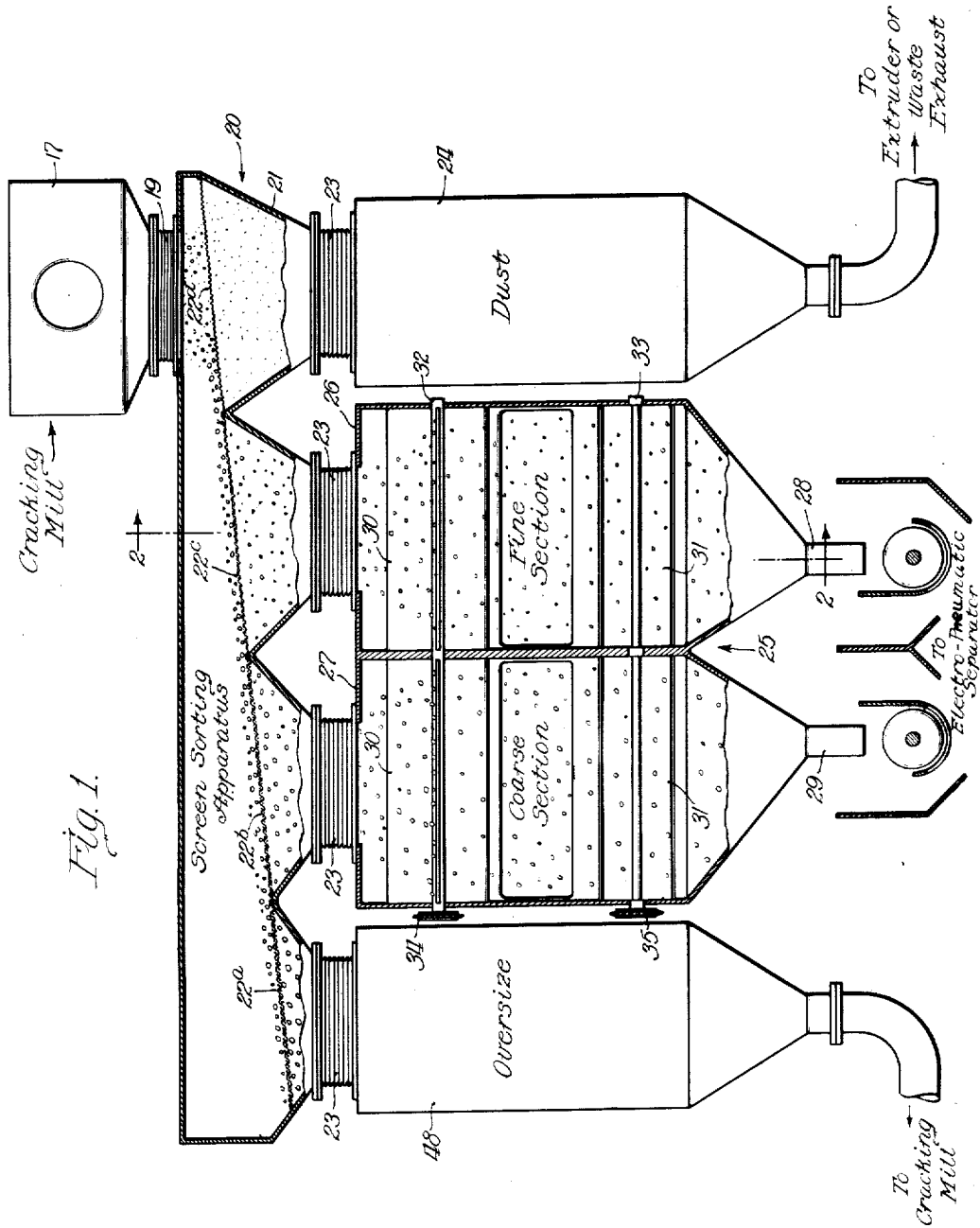

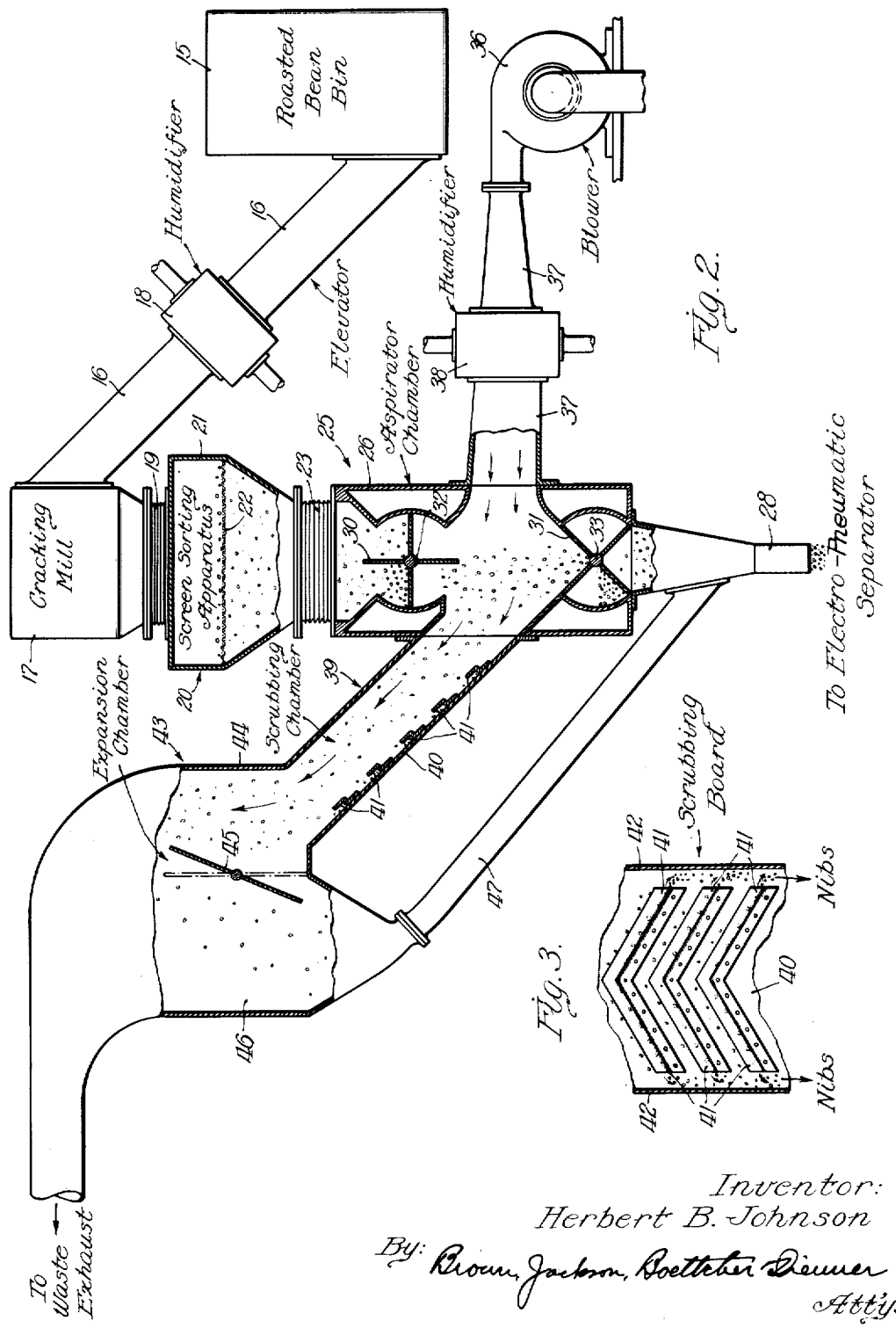

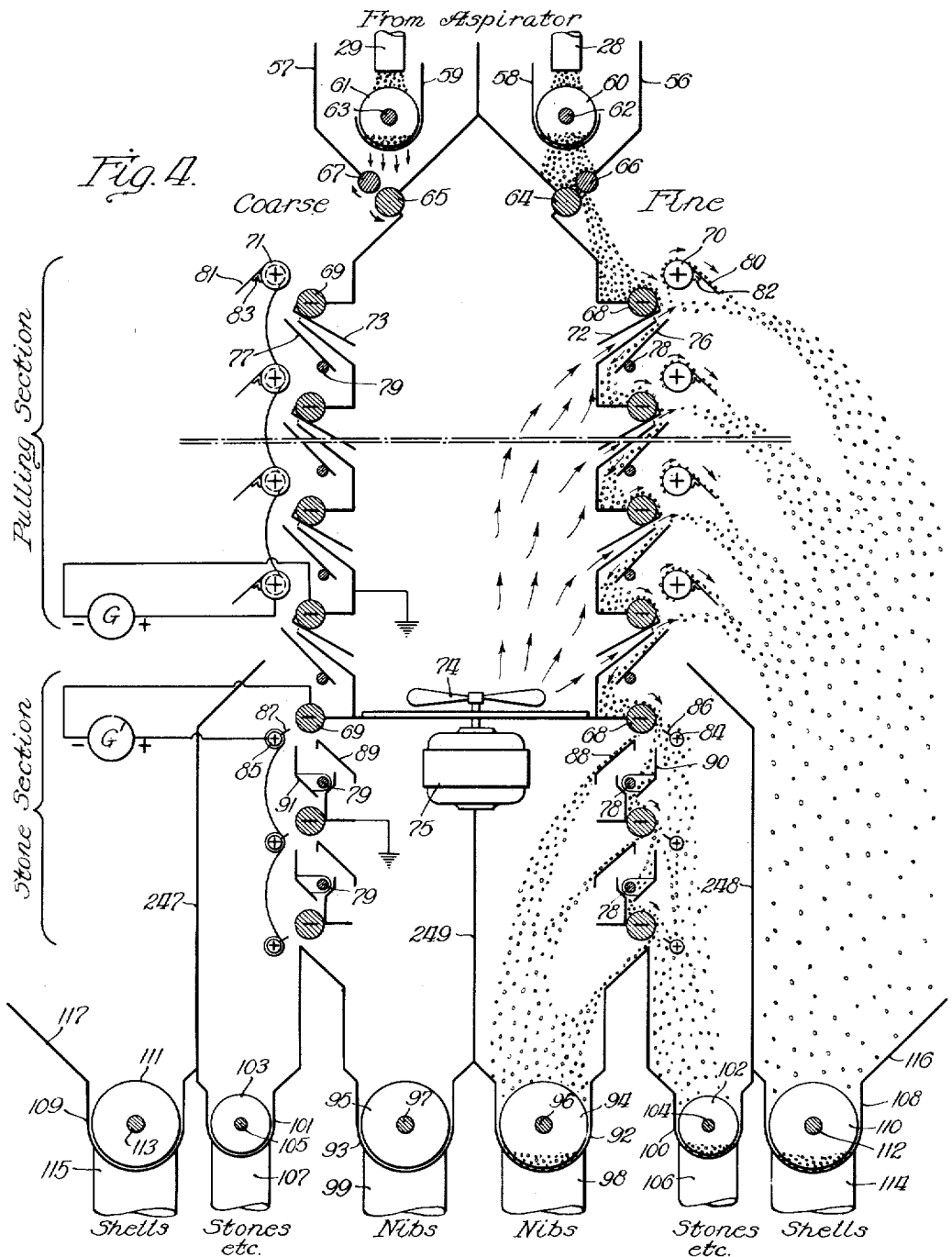

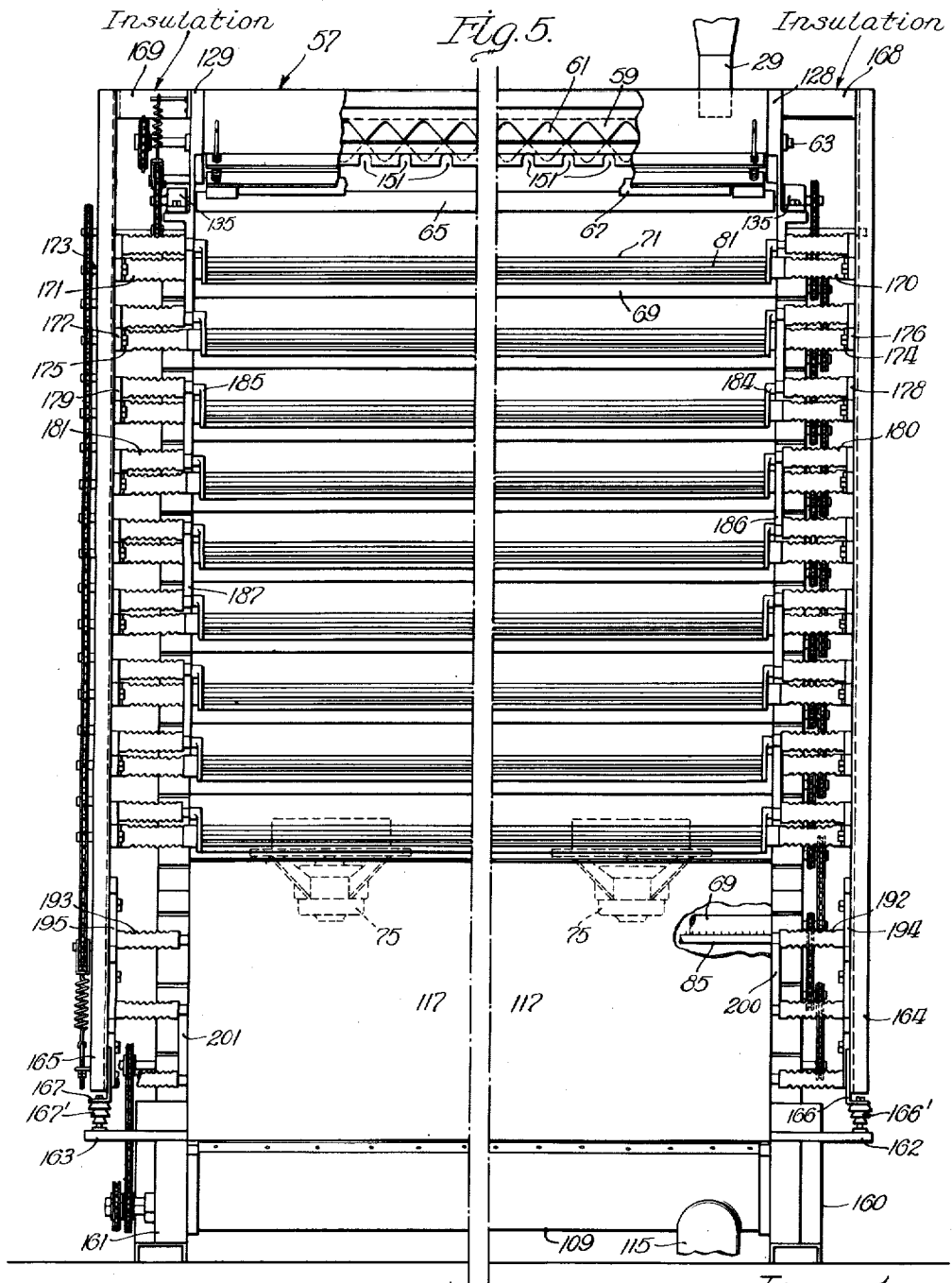

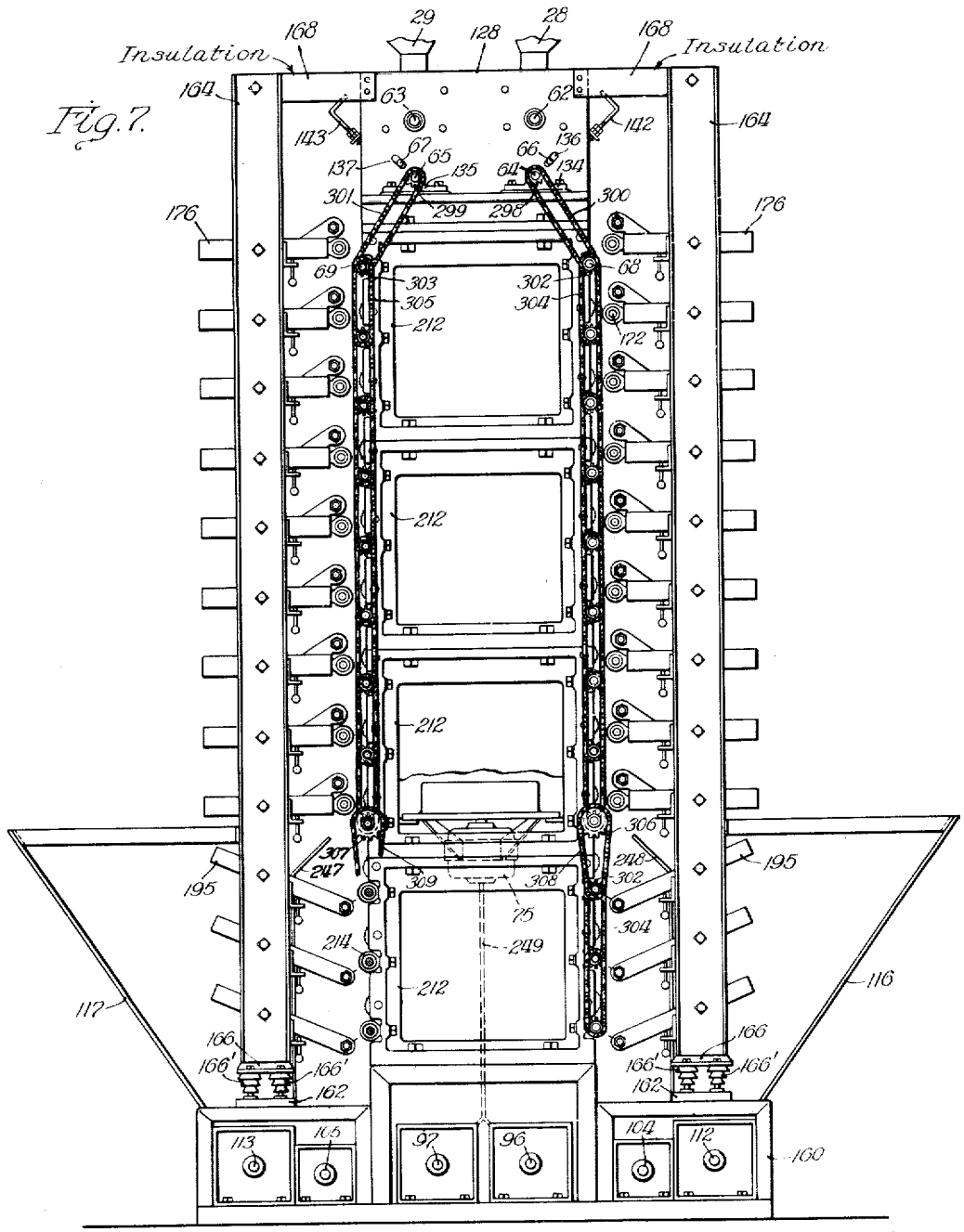

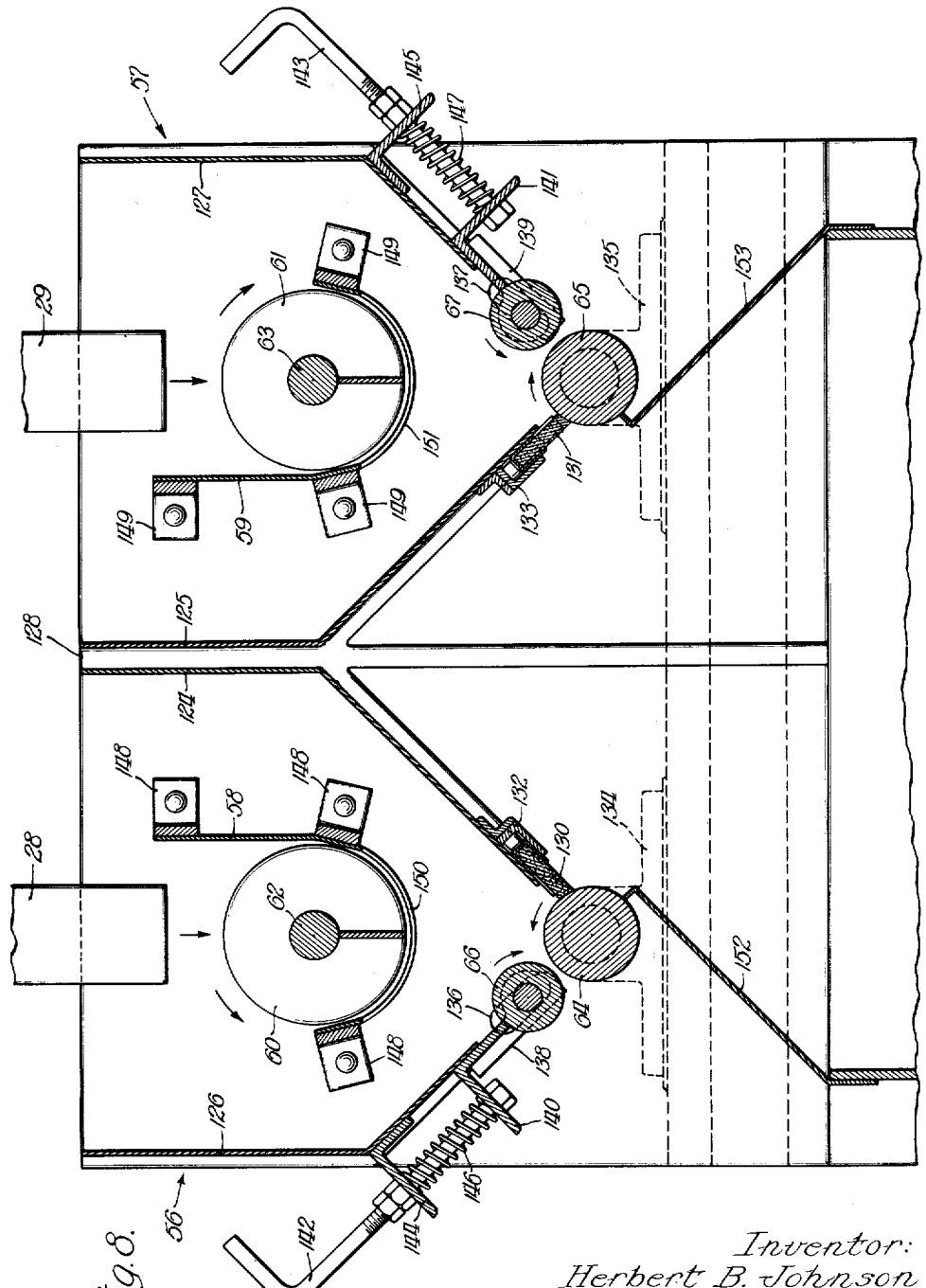

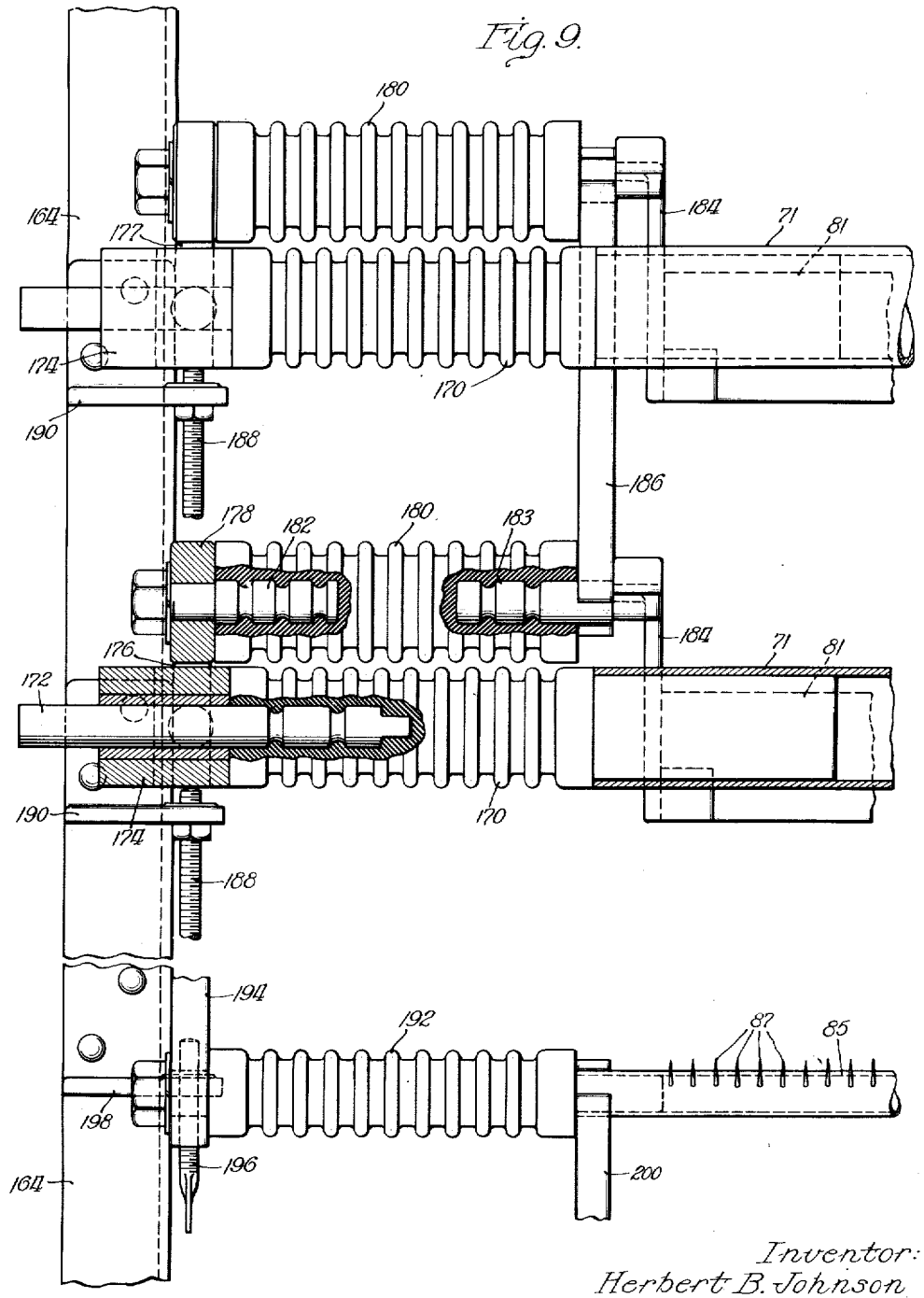

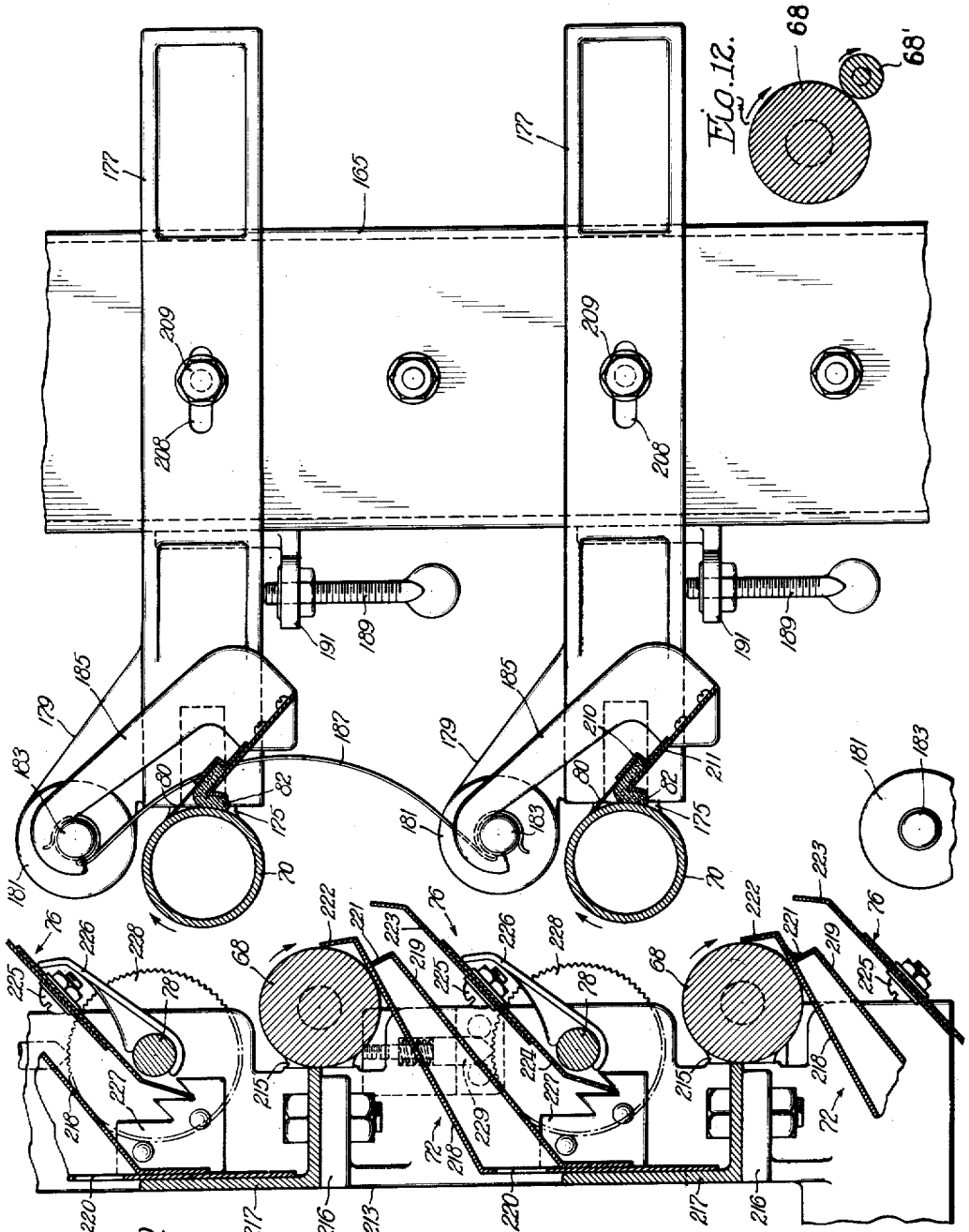

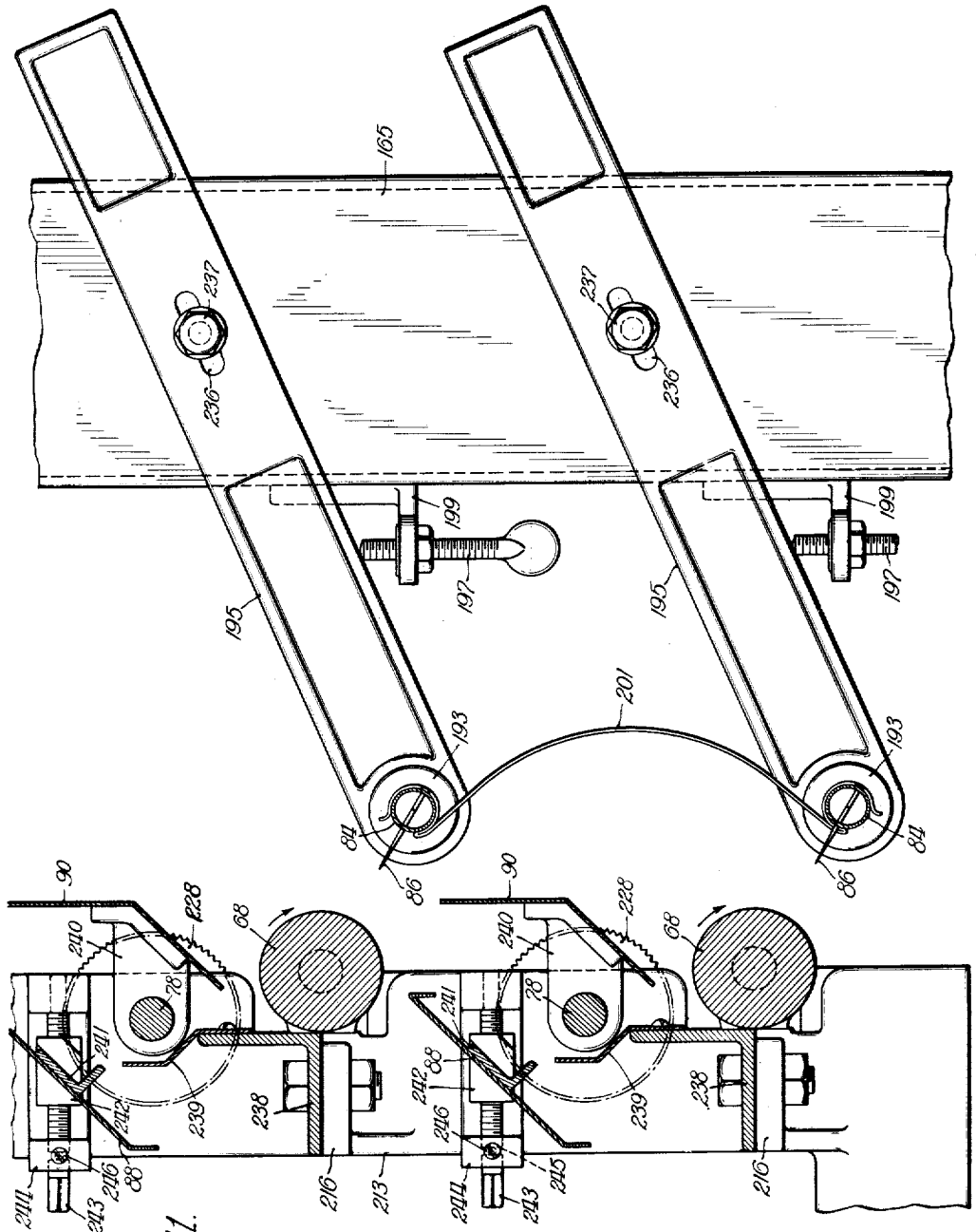

Patented Nov. 8, 1938

2,135,716

UNITED STATES PATENT OFFICE 2,135,716

METHOD AND APPARATUS FOR SEPARATING FOODSTUFF OF THE NATURE OF COCOA BEANS

Herbert B. Johnson, Rochester, N. Y., assignor to Ritter Products Corporation, Rochester, N. Y., a corporation of New York Application February 27, 1937, Serial No. 128,097

10 Claims. (Cl. 209—2)

My invention relates generally to separating apparatus and it has particular relation to such apparatus as used for cleaning food stuff of the nature of cocoa beans and the like. While my invention will be disclosed by an embodiment thereof suitable for separating the nibs of cocoa beans from the shells, metallic particles, stones, and other extraneous material, it will be understood that it is not to be so limited and that it may be employed for separating other materials as may be acted upon in the manner to be hereinafter set forth.

The cleaning of the nibs of cocoa beans, according to the practice of the prior art, requires complicated and bulky equipment, the functioning of which is variable from day to day, and unsatisfactory from the standpoint of efficiency. The separation curve, which is obtained by plotting the percentage of cleaned nibs in the final product against time of operation after the separation apparatus itself has been thoroughly cleaned, steadily slopes downwardly, indicating that the separation efficiency is continually decreasing. Over a period of time, such as a month, this curve shows a succession of elevations and depressions, the elevations representing the operation while the apparatus is functioning at its highest efficiency, while the depressions represent the operation at the lowest permissible efficiency. It is customary to shut down the apparatus periodically, for example, once each week, for the purpose of cleaning it and restoring it to its maximum efficiency of operation. Since the apparatus normally is intended for operation during the entire 24 hours of a day, it will be apparent that the shut-down period constitutes a factor of considerable importance in the operation of a chocolate manufacturing establishment. With the variations in the separation curve decreased to a considerable extent or practically eliminated, the efficiency of the apparatus is improved and the cost of operation is correspondingly reduced.

Cocoa beans are obtained from certain of the tropical countries. The conversion of these beans into a multitude of food products constitutes a large industry employing many persons, and it requires the provision of many other products for mixing or combining with the cocoa product. The first requirement in this manifold industry is to secure the useful part of the cocoa bean by separating it from the remaining parts, as well as from extraneous material, which parts and material are not useful or desirable in the final product. It is to this particular phase of manufacture of cocoa products that my invention is addressed.

The cocoa beans are imported whole, in which condition they contain a considerable amount of moisture. With a view to driving out this moisture and to provide the proper flavor in the resulting product, as well as to convert it into such condition that it may be processed, the raw beans are roasted in suitable ovens where they are constantly agitated to insure complete and uniform roasting. After the raw beans are roasted, they are cracked in a suitable cracking mill to permit separation of the meats or nibs from the surrounding shells. The meats or nibs are rich in butter fat and constitute the useful portion of the beans, while the shells contain substantially little butter fat, are fibrous in texture, and entirely unsuitable for use in making cocoa products. The more nearly the nibs are completely separated from the shells, the better will be the resulting product and the cheaper will be the cost of further processing it.

After the beans are cracked, the entire product is passed over a screen containing different sizes of openings ranging from small to large. The cracked product is introduced onto the screen at the section containing the smallest openings and it successively passes along it to sections containing larger and larger openings, the screen meanwhile being agitated to effect a separation according to size and without regard to composition. The dust separated out by the smallest openings is either sent to the expeller for extraction of cocoa butter or is discarded, while the largest particles are returned to the cracking mill to be reduced in size and passed over the sizing screen a second time.

The remaining product, comprising a mixture of shells, nibs, and extraneous material such as metallic particles, stones, and the like, is conveyed to a fanning machine where it is subjected to blasts of air which remove a greater portion of the shells. Such apparatus is necessarily bulky and requires relatively large floor space and head room. Moreover, it requires careful adjustment for efficient operation. For example, while the fanner may be adjusted to operate properly for a certain rate at which the product is fed to it, if this rate of speed is either increased or decreased to any great extent, there will be a decrease in the cleaning efficiency. Either a smaller percentage of shells will be removed or a larger percentage of the nibs will be combined with the shells separated from the balance of the product, resulting, in the one case, in a product having a relatively high shell content, and, in the other case, in a waste of otherwise useful nibs. At the present time cocoa beans cost in the neighborhood of $140 per ton, and it will, therefore, be appreciated that any otherwise useful portion that is discarded due to improper separation, constitutes a considerable loss.

The product, as it comes from the fanner, still contains a relatively high percentage of shell and other material. It is, therefore, necessary to process it further. The final separation is effected by passing the different sizes of product over corresponding tables known in the art as "dry tables", which are rapidly agitated. Obviously, rapid wear of the agitated parts results. The weight of the heavier shells and the bark is approximately the same as pieces of flat scaly nibs which are produced in crushing or cracking operations, and effective separation by any air gravity method is impossible. The clean nibs are then ground or otherwise processed for making the various chocolate liquor and cocoa products.

An appreciable percentage of shell content in the final product is highly undesirable, for several reasons. It affects the taste and the purity of the products, causing them to deviate from certain standards demanded by the trade and required by law. Therefore, a careful check is made of the shell content of the final product, and it is re-passed over the dry tables in the event that the percentage thereof is too high.

Another reason for keeping the shell content to a minimum is to reduce the cost of processing the final cleaned product. The nibs, as obtained from the dry tables, are conveyed to grinding mills where they are very finely ground. While the nibs are comparatively easily ground, difficulties are encountered if there is an appreciable shell content combined therewith. That is, more power is required to perform the grinding process and a longer time is required to complete it, due to the tough, fibrous nature of the shell material.

All of the foregoing apparatus, particularly the fanner and the dry tables, depends, for its efficient operation, on being clean and free from deposits of residue from the nibs which tend to clog it and to prevent the free flow and efficient separation of the products. It is, therefore, necessary, as stated hereinbefore, to shut down the separating apparatus periodically and thoroughly clean it, in order to maintain the required cleaning efficiency. The dry table tops must be cleaned every eight hours.

In order to obtain a product which will meet the standard set by the law and the trade, it has been necessary to discard, along with the shells, a certain portion of the nibs which could otherwise be used as pure cocoa. While, on the average, about 90% by weight of the cocoa beans constitutes the useful product, it has been necessary to be satisfied with obtaining or recovering about 80%, in order to insure the necessary minimum shell content in the resulting product. There has been, then, a loss of about 10% by weight of otherwise useful product that has been discarded along with the shell, which, considering the relatively high cost of cocoa beans, represents an appreciable loss when they are used in large quantities, as is now the case in the industry.

It is, therefore, an object of my invention, generally stated, to provide apparatus for effecting a separation of different parts of a mass of food stuff by combining the art of electrostatic separation, working on the differences in electrical conductivity of the particles to be separated, in addition to improved air-gravity methods that will be more efficient in operation, and which will be readily and economically manufactured and installed.

My work shows conclusively that there is a wide difference in the electrical conductivity of the heavy shell, bark, and the flat or scaly nibs produced in cracking operations, thereby permitting the very effective separation of the two electrically which cannot be accomplished by the present air-gravity methods alone.

The principal object of my invention is to provide for effecting a more complete separation of the different parts of a mass of food stuff, such as cracked cocoa beans, than has heretofore been possible with the apparatus available prior to my invention, as herein disclosed, thereby decreasing to a minimum the amount of usable product that is discarded with the waste product because of limitations in separating ability of the apparatus used.

An important object of my invention is to provide for humidifying the shells of cocoa beans after roasting, for improving the electrical conductivity thereof to render them more susceptible to the influence of an electro-static field.

Another important object of my invention is to subject the various sizes of cracked cocoa beans, as they drop through a separating screen, to an air blast for removing a major portion of the shells and to pass the air blast containing the shells and a portion of the nibs over a scrubbing device and through a classifier to remove the nibs therefrom.

Another object of my invention is to cause the product to be separated by an electro-static separator of the horizontal roller type to uniformly flow in a thin stream, approximately one particle thick, to the separating zone without classification of the product by the feeding mechanism.

Still another important object of my invention is to successively subject the combined shell and nib product to a series of electrostatic fields and to turn the combined product over as it enters the field for improving the response thereto.

A further object of my invention is to provide a scraping and abrasive cleaning action on the charged roller electrode of an electro-static separator for presenting a smooth and polished surface to the product being processed therethrough.

Still another object of my invention is to successively subject the shell-free product to a series of electro-static spray discharges for separating out extraneous material such as metallic particles, bark, and the like which may still remain.

Other objects of my invention will, in part, be obvious and in part appear hereinafter.

My invention, accordingly, is disclosed in the embodiment hereof shown in the accompanying drawings, and it comprises the features of construction, combination of elements, and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawings, in which:

Figure 1 is a view, partly in side elevation and partly in section, showing apparatus for cracking the cocoa beans, separating the cracked product according to size and removing a portion of the shells;

Figure 2 is a view taken along the line 2—2 of Figure 1, showing more in detail the aspirator and separating apparatus;

Figure 3 is a fragmentary view showing the construction of the scrubbing board located on the floor of the scrubbing chamber;

Figure 4 is a diagrammatic view illustrating the construction and functioning of the electrostatic separator;

Figure 5 is a view in front elevation of the electropneumatic separator, certain parts being broken away to more clearly illustrate the invention;

Figure 6 is a view in end elevation of the left-hand end of the electro-pneumatic separator as viewed in Figure 5;

Figure 7 is a view in end elevation of the right-hand end of the electro-pneumatic separator as viewed in Figure 5;

Figure 8 is an enlarged sectional view looking to the right in Figure 5 and illustrating the construction of the hoppers;

Figure 9 is a view, partly in side elevation and partly in section, showing the mounting of the high potential roller electrodes and the spray discharge electrodes;

Figure 10 is a view, partly in side elevation and partly in section, taken looking to the left in Figure 5, and showing the arrangement of the high potential and the grounded roller electrodes of the pulling section on the back side of the electropneumatic separator;

Figure 11 is a view taken similar to that of Figure 10, showing the arrangement of the spray discharge electrodes and the grounded roller electrodes of the stone section; and, Figure 12 is a detail sectional view of an alternate arrangement of one of the grounded electrodes.

According to my invention, I dispense with the customary dry fanner equipment and agitated dry tables, requiring relatively large floor space and head room, and substitute for them comparatively simple apparatus which requires much less space, less power for operation, and which affords a higher degree of separation, so that a considerable portion of the product, that formerly was considered as being inseparable from the waste products, may now be recovered. Moreover, the apparatus organized and operated according to my invention is equally effective in performing its separating function up to its full capacity, whether the product is fed thereto in large or small quantities. It is, then, unnecessary to maintain a highly uniform flow of product through the apparatus, as has been required in the operation of the apparatus which has heretofore been used.

I feed the roasted beans to the cracking mill by means of a suitable conveyor through a humidifier. The humidifier is arranged to generate a moist atmosphere so that the shells, which have been thoroughly dried out in the roasting process, are moistened to increase their electrical conductivity, thereby permitting more efficient segregation later on by the electro-static separator. It is desirable to apply the moisture to the beans before they are cracked, in order to limit it to the shells alone and to avoid applying it to the nibs. However, as will be set forth hereinafter, the moisture may be applied during a later step in the process, after the beans are cracked, if it appears desirable to do so. The cracked product is then fed onto a screen having four sections which may be designated as follows: dust—fine—coarse—oversize. The screen is agitated and, since the cracked product is fed onto it at the fine section, corresponding portions according to size are separated out. The dust portion is delivered to the extruding machine for extraction of cocoa butter, while the oversize portion is returned to the cracking mill for further reduction in size.

The coarse and fine portions of the cracked product are dropped into individual sections of an aspirator chamber which is provided with valves at the top and bottom for preventing the free flow of air from the chamber out through these openings. A blast of air is applied at one side of the aspirator chamber and it passes through the cracked product to remove a large portion of the shells. The remaining part of the cracked product passes out of the chamber through the valve at the bottom and is conveyed to the electro-static separator for final processing. If desired, the air entering the aspirator chamber may be humidified to provide the required degree of conductivity of the shells. Since the nibs do not as readily absorb moisture, the difference in electrical conductivity of the shells and the nibs still remains, but not to the same extent as when the moisture is applied to the beans as they are fed to the cracking mill. However, this seems to make little difference in actual operation.

The exhaust outlet from the aspirator chamber comprises an upwardly inclined scrubbing chamber, so termed because of the provision of scrubbing riffles set on a bias on the under inclined side thereof. The scrubbing chamber is provided with a partition to provide sections corresponding to the sections in the aspirator chamber. Because of the inclined under surface of the scrubbing chamber and the riffles thereon, a large portion of the nibs carried with the shells by the air blast are removed and, since the riffles are inclined, these nibs slide downwardly and are returned to the bottom of the aspirator chamber, where they join with the product that is exhausted therefrom.

The air blast carrying the shells and a portion of the nibs passes into an expansion chamber between and adjustable baffle and a side wall which form a continuation of the scrubbing chamber. When the blast passes the end of the baffle it expands, due to the sudden change in cross-sectional area of the passageway, and consequently it loses a considerable portion of its velocity. The nibs, which are heavier than the shells, fall downwardly and are returned to the product as it comes from the aspirator chamber, while the lighter shells are exhausted to a suitable waste receiver.

The final separation is effected by means of a separator which depends principally for its operation on the creation of a series of electro-static fields through which the product passes, assisted by circulating air currents. The separator is of the dual type, one part being adjusted to process the coarse portion of the product as obtained from the aspirator, while the other part is adjusted to process the fine portion. Each part of the separator comprises a series of grounded roller electrodes, spaced one above the other in a vertical plane, onto which the product is successively fed for effecting the separation in a succession of steps. The upper group of grounded electrodes is associated with a corresponding series of high potential roller electrodes forming a pulling section. As the product passes from one grounded electrode to the next, a portion of the shells is attracted towards the high potential electrodes until substantially no shell content remains as the product leaves the last grounded electrode of this group. The lower group of grounded electrodes forms a stone section and has associated therewith a series of high potential stationary electrodes provided with a large number of needles, forming a comb-like structure to provide a spray discharge to the grounded roller electrodes individual thereto. In this section any metallic particles, stones, bark and shell particles which may be present are removed, while the cleaned nibs are discharged from the bottom grounded roller electrode to a suitable conveyor, by means of which they are removed for further processing. In order to assist in separating the metallic particles, stones, and the like from the nibs in the stone section, the grounded electrodes of this section are arranged to be driven at a higher speed than are the grounded roller electrodes of the pulling section. Due to the difference in mass of the particles being separated the additional centrifugal force caused by the higher speed assists the spray discharge in effecting the separation.

It is desirable that the product be uniformly fed along the entire length of the top of the pulling section in order to obtain the same efficiency of separation, regardless of the quantity of product being processed by the electro-static separator. In order to accomplish this purpose the product is distributed from one end of a hopper by a screw conveyor. The bottom of the hopper is provided with transverse slots through which the product to be separated falls onto a pair of feed rolls which rotate in opposite directions at different peripheral speeds. In this manner a classification of the product in the hopper is prevented which would otherwise effect a concentration of shells at the end opposite from that at which the product is fed into the hopper. The oppositely rotating feed rolls cause the product to be dropped onto the top ground roller electrode of the corresponding section of the separator in a uniform stream approximately one particle thick.

With a view to exposing the particles to the full effects of the electro-static field, each of the grounded roller electrodes is provided with a ground roller chute having an edge disposed along the electrode surface where the product tends to leave it as affected by the force of gravity and the pull of the electro-static field. This edge tends to turn the particles over, so that those which otherwise would not be affected by the electro-static field receive a greater charge and accordingly the separating efficiency is improved. This air distribution arrangement between the electrodes and through the electro-static fields may also be used as a method of conditioning the material for separation by adding moisture to humidify, or hot air to dry the surface, or, in some cases, special gases may be introduced which might condition the material or maintain a controlled air gap between the charged and ground electrode that will improve the conductivity of the material and also maintain most constant conditions of the air gap between the two electrodes, regardless of the outside or room atmospheric conditions.

I have found that it is desirable to maintain the surface of the high potential roller electrodes highly polished and free from particles of the product being processed, for the purpose of increasing the separating efficiency and preventing the forming of points from which static discharges can take place. This is accomplished by providing a scraper engaging the high potential electrode surface having a wiper positioned underneath and arranged to also engage the electrode surface. The wiper is preferably formed of felt having a slightly abrasive character to provide the required cleaning and polishing action. In this manner a smooth surface is always provided on the high potential roller electrodes, with a corresponding increase in effectiveness thereof.

Referring now particularly to Figures 1 and 2 of the drawings, it will be observed that the reference character 15 designates a bin in which the roasted cocoa beans may be placed after they are removed from the roasting ovens. An elevator 16, which may be in the form of a screw conveyor, is provided for carrying the roasted beans to a cracking mill 17, where they are cracked to permit separation of the nibs from the shells. The cracking mill 17 may be of any suitable form, well known to those skilled in the art, and therefore a description of it will not be set forth herein, since its construction forms no part of my invention.

The roasted cocoa beans are practically free from surface moisture, which has been driven off during the roasting process. In order to increase the effectiveness of the electrostatic separator through which the cracked product is processed and to increase the conductivity of the shells, a humidifier 18 is provided to cooperate with the elevator 16. The humidifier 18 may take the form of a series of nozzles from which very fine streams of water are caused to flow to provide a moist atmosphere through which the cocoa beans are passed, so that the shells will absorb a certain degree of moisture. When the humidifying action takes place at this point only the shells are subjected thereto, since the beans, as yet, have not been cracked.

After the beans are cracked by the mill 17 they fall through a flexible tubular conduit 19 into a screen sorting apparatus, shown generally at 20. The screen sorting apparatus 20 comprises a housing 21 and an inclined screen 22 having four sections 22a, 22b, 22c and 22d, each provided with openings having different sizes, in order to segregate the cracked product according to size. Thus the section 22a, at the lower end of the screen 22, is provided with the largest openings, through which pass the particles that will not pass through the smaller sized openings in the sections above it. The screen sorting apparatus 20 is arranged to be agitated by any suitable means (not shown) so that the cracked product from the cracking mill 17 will flow downwardly over the screen 22 and will be readily sorted with respect to size. Connections are made with the various sections of the screen sorting apparatus 20 by means of flexible tubular conduits 23. It will be understood that the conduits 19 and 23 are constructed in the manner indicated in order to permit the agitation of the screen sorting apparatus 20 while yet maintaining a closed connection therewith.

The first section 22d of the screen 22 separates out the dust particles from the cracked product and they fall into a dust section 24. The dust is conveyed either to an extruder for the extraction of cocoa butter or to a suitable waste exhaust, as indicated.

Sections 22c and 22b are provided with fine and coarse openings for separating out corresponding sizes of the cracked product. The cracked product from these two sections falls into an aspirator, shown generally at 25, which is divided into two compartments 26 and 27 corresponding, respectively, to the fine and coarse cracked products. At the bottom of each of the compartments 26 and 27 spouts 28 and 29 are provided for feeding the product therefrom into suitable hoppers of an electro-pneumatic separator the details of which will be set forth hereinafter. At the top and the bottom of the aspirator 25 valves 30 and 31 are provided which are mounted rotatably on shafts 32 and 33, which may be suitably journaled in the side walls of the aspirator. Sprockets 34 and 35 are provided for connection to a suitable driving means (not shown), whereby the valves 30 and 31 may be rotated to admit the cracked product into and exhaust it from the compartments 26 and 27 without permitting the free flow of air at these points.

With a view to removing a considerable portion of the shells from the cracked product as it passes through the aspirator 25, a current of air is blown therethrough by means of fans or blowers 36, only one of which is illustrated. The blower 36 is connected to the aspirator chamber 26 by means of a suitable conduit 37. It will be understood that a single blower may be employed for both of the compartments 26 and 27 without departing from the scope of my invention.

In some cases it may be more convenient to introduce the moisture to the shells by humidifying the air which is blown through the aspirator chamber. For this purpose a second humidifier 38 is provided, as illustrated, in the conduit 37, and its construction may be similar to that described hereinbefore for the humidifier 18. Instead of water, steam may be employed for obtaining the desired humidifying action. It may be undesirable to introduce the moisture into the air which flows through the aspirator chamber since, in this case, the nibs as well as the shells are moistened. However, in actual practice, this appears to make little, if any difference, since the shells pick up a much larger percentage of moisture than do the nibs. The desired electro-static separation will take place, whether the moisture is introduced before the beans are cracked or after they are cracked.

It will now be apparent that the valves 30 and 31 are provided to prevent the escape of air from the blower 36 through the top and bottom of the aspirator chamber, thereby permitting it to flow only through a scrubbing chamber, shown generally at 39. Since the shells are considerably lighter than the remaining cracked product, a considerable portion of them is removed as it falls through the aspirator chamber and is carried upwardly through the scrubbing chamber 39. However, a certain portion of the nibs is also carried along with the shells into the scrubbing chamber 39, which portion it is desirable to recover, since it constitutes a large part of the nibs. For this purpose the floor 40 of the scrubbing chamber 39 is inclined upwardly and is provided with a series of riffles 41. The riffles 41 are in the form of Z-shaped angles which are disposed on a bias on the floor 40. As is illustrated more clearly in Figure 3 of the drawings, the riffles 41 are arranged in two sections corresponding to the two compartments 26 and 27 of the aspirator 25. The riffles 41 do not extend entirely to the side walls 42 of the scrubbing chamber 39, thereby forming a trough along which the nibs may flow and be returned to the bottom of the aspirator chamber. As a result of the flow of air upwardly through the scrubbing chamber carrying a portion of the shells as well as a portion of the nibs, a scrubbing action takes place, caused by the riffles 41, and the heavier nibs are separated out from the shells and are returned to the aspirator chamber, while the balance of the air blast flows on upwardly into an expansion chamber shown generally at 43.

The air blast which flows into the expansion chamber 43 still carries with it a portion of the nibs which it is desired to recover and which would otherwise constitute a considerable loss if the product from the scrubbing chamber were directly permitted to flow to the waste exhaust. The blast enters the expansion chamber 43 between a side wall 44 thereof and an adjustable baffle 45 which form a continuation of the walls of the scrubbing chamber 39. As the blast passes the end of the baffle 45 it suddenly expands, due to the greatly increased cross-sectional area of the expansion chamber 43 at this point. The product carried by the blast loses a considerable portion of its velocity as a result of such expansion and a large portion of the remaining nibs, due to their being heavier than the shells, fall downwardly through the compartment 46 and are returned by the conduit 47 to the spout 28 underneath the aspirator chamber. The remaining product, comprising almost entirely pure shell product, is then conducted to a suitable waste exhaust, as indicated.

The balance of the cracked product in the screen sorting apparatus 20 falls through the oversize section 22a of the screen 22 into the chamber 48 from which it is returned to the cracking mill to be further reduced in size. The re-cracked product is then again fed over the screen 22 and is again separated according to size.

While the aspirator apparatus shown in Figures 1, 2 and 3 of the drawings is effective to remove a fairly large percentage of the shells from the cracked product, further cleaning is necessary in order to obtain a substantially pure nib product which may be further processed to form various cocoa products. In order to effect this final degree of cleaning or separation, an electro-pneumatic separator is provided, into which the cracked product as it comes from the aspirator apparatus is fed for further processing. This apparatus will now be described, reference being had first to the diagrammatic representation illustrated in Figure 4 of the drawings.

As shown in Figure 4, the electro-pneumatic separator is divided into two parts forming a dual separator corresponding to the coarse and fine sizes of cracked product which are obtained through the spouts 29 and 28 from the aspirator apparatus. The electro-pneumatic separator is shown diagramatically in this figure of the drawings in order to illustrate more clearly the construction and functioning thereof without regard to the mechanical details which are necessarily employed in the actual construction and operation of a device of this type. The details of construction are shown in additional figures of the drawings and a description thereof will be set forth hereinafter.

It will be observed that the cracked product, as it comes from the spouts 28 and 29, enters hoppers 56 and 57, located at the top of the electro-pneumatic separator and having mounted therein troughs 58 and 59. It will be noted that the illustration of the aspirator apparatus shown in Figure 1 may be aligned with the diagrammatic representation of the electro-pneumatic separator shown in Figure 4 for the purpose of illustrating by this combination of figures the entire apparatus which goes to make up my invention. It will be understood that the aspirator apparatus shown in Figure 1 may be mounted on one floor of a building and that the electro-pneumatic separator, shown in Figure 4, may be mounted on the floor directly below. However, other suitable arrangements may be made of these two pieces of apparatus and a suitable conveyor mechanism may be provided for carrying the coarse and fine cracked products from the spouts 28 and 29 to the hoppers 56 and 57, as may be desired.

The cracked product from the spouts 28 and 29 falls at one end of the troughs 58 and 59 and is fed therealong by screw conveyors 60 and 61 which are mounted on shafts 62 and 63, respectively. In order to uniformly distribute the cracked product along the hoppers 56 and 57, the troughs 58 and 59 are provided, at spaced intervals, with slots along the bottom thereof, as will be set forth in detail hereinafter. The cracked product is then not segregated in the troughs 58 and 59 with a larger shell content at one end than at the other, as would otherwise be the case if these slots were not employed. Along the bottoms of the hoppers 56 and 57 rotatable feed rollers 64 and 65 are provided for cooperation with resiliently mounted rotatable distributing rollers 66 and 67. The feed rollers 64 and 65 and the distributing rollers 66 and 67 are arranged to be rotated in opposite directions, as indicated by the arrows, at different peripheral speeds, in order to uniformly distribute the cracked product therefrom as it falls in small uniform piles thereon from the slots in the troughs 58 and 59. In this manner the cracked product flows from the rollers at the bottom of the hoppers 56 and 57 in a thin sheet approximately one particle thick. Since the distributing rollers 66 and 67 are resiliently mounted, they are free to move outwardly in the event that a large particle should be fed therebetween.

The cracked product from the rollers at the bottom of the hoppers 56 and 57 is successively fed onto a series of grounded roller electrodes 68 and 69 which are positioned one above the other. Although only four of these electrodes are illustrated in this figure of the drawings, I have employed nine of them in a concrete embodiment of my invention, as will be illustrated hereinafter.

Cooperating with the grounded roller electrodes 68 and 69 are corresponding high potential roller electrodes 70 and 71 which are disposed in insulated spaced relationship slightly above and outwardly therefrom. The grounded roller electrodes 68 and 69 and the cooperating high potential electrodes 70 and 71 form a pulling section, as illustrated, by the legend at the left-hand side of Figure 4, and they are effective to remove substantially all of the shells from the cracked product that is passed therebetween. In order to effect this separation the grounded and high potential electrodes are maintained at a high difference of direct current potential from a suitable source such as a generator G. The generator G may be of any suitable type. For example, a source of commercial frequency alternating current may be employed, together with suitable transformers and rectifiers, either mechanical or electronic, to obtain the desired difference of potential for creating an electrostatic field between the grounded and the high potential roller electrodes. It will be understood that all of the grounded roller electrodes 68 and 69 are connected in parallel circuit relation and in like manner that all of the high potential roller electrodes 70 and 71 are connected in parallel circuit relation and that the two parallel circuits are connected across the terminals of the source of high potential direct current.

As is well known to those skilled in the art, the separation of the shells from the nibs takes place when the combined product is subjected to an electrostatic field because of the difference in conductivity between these two different products. The shells assume a charge corresponding to the polarity of the grounded electrodes and are immediately attracted to the high potential electrodes while the nibs, which are less conductive, do not acquire the charge so quickly, and as a result they are not attracted. This effect, or difference in conductivity, is further increased because of the humidifying of the shell particles either before or after the beans are cracked, as set forth hereinbefore. The electrodes 68 and 70 and the electrodes 69 and 71 are rotated in the same directions, as indicated by the arrows, in order to feed the cracked product to the next lower pair of electrodes and also to remove the shells therefrom. The number of pairs of electrodes for each side depends upon operating conditions and the adjustments of the apparatus. I have found, as set forth hereinbefore, that nine pairs of electrodes for each section are sufficient to effect the necessary degree of separation. However, a greater or a lesser number of pairs may be employed without departing from the scope of my invention.

The grounded roller electrodes 68 and 69 of the pulling section are each provided with ground roller chutes 72 and 73, as illustrated. The outer ends of these chutes are arranged to provide a scraping action along the surface of the grounded rollers 68 and 69 for the purpose of turning over the cracked product as it is fed thereto by rotation of these electrodes. This turning action takes place while the cracked product is subjected to the main effects of the electro-static fields maintained between these electrodes and the cooperating high potential electrodes and the shell particles are thereby rendered more responsive to the action of these fields. The reaction of these particles to the attractive force of the electrostatic field depends, to a considerable extent, upon the relative position thereof with respect to the fields. Thus, if the flat side of the shell particles happens to be subjected to the influence of the electrostatic field, the effect thereof will not be so great as if it were presented edgewise thereto. This turning action as effected by the ground roller chutes increases the likelihood that the shell particles will be presented to the electrostatic field in the manner most advantageous for attracting them and separating them from the nibs.

The ground roller chutes 72 and 73 perform a second function in acting as nozzles to direct the flow of air from one of several fans 74, which may be driven by motors 75 that are located on the inside of the electro-pneumatic separator at the bottom of the pulling section. The fans 74 cause air to flow through the ground roller chutes as indicated by the arrows, to assist in the separation of the lighter shell particles from the cracked product as it is successively fed from one pair of electrodes to the next.

In order to direct the cracked product onto the next grounded electrode, dividers 76 and 77 are provided which may be mounted on shafts 78 and 79, respectively. The shafts 78 and 79 are adjustably mounted, so that the positions of the dividers 76 and 77 may be changed as desired.

I have found that it is highly desirable to maintain the surfaces of the high potential roller electrodes 70 and 71 smooth and free from shell particles. If the electrode surfaces are not maintained in this condition, shell particles will build up to form discharge points which will cause repeated breakdowns between the electrodes, and which will cause the shells to stick to the grounded electrodes instead of being repelled. For this purpose scrapers 80 and 81 are provided, having knife-like edges, and are disposed against the direction of rotation of the high potential roller electrodes 70 and 71 so that a scraping action results. With a view to further assisting in this cleaning action, wipers 82 and 83 are provided underneath the scrapers 80 and 81, as illustrated. The wipers 82 and 83 are formed, preferably, of felt, having slightly abrasive characteristics, so that a smoothing and polishing action simultaneously takes place along the surfaces of the high potential electrodes 70 and 71. It will be apparent that the wipers 82 and 83 having abrasive characteristics such that the surfaces of the high potential electrodes 70 and 71 are maintained in a smooth and polished condition serve to prevent the formation of an oxide film on these electrodes and to remove it, if such a film has been formed, immediately after the separator is initiated into operation after it has been shut down.

After the shell particles have been removed from the cracked product there still may remain with the nibs a certain amount of extraneous material such as stones, metallic particles, and the like. This material is mixed with the beans while they are being handled and must be removed from the final product.

For this purpose a stone section is provided at the bottom of the electro-pneumatic separator, as illustrated. The same grounded roller electrodes 68 and 69 are employed in this section as were employed for the pulling section immediately above. However, it is desirable to provide a spray discharge through which the product may be passed in order to effect the necessary separation between the stones, metallic particles, and the like, from the nibs. To this end spray discharge electrodes 84 and 85 are provided, each having a plurality of needles 86 and 87 which form a series of discharge points from which an electrostatic discharge takes place to the corresponding grounded roller electrode. Since it is desirable to maintain a different potential between the electrodes of the pulling section, a separate generator G' is provided. The generator G' may be similar in construction to that of the generator G hereinbefore described, but it will be understood that the current capacity thereof must be considerably greater, due to the fact that an appreciable discharge takes place from the needles 86 and 87 to the corresponding grounded roller electrodes 68 and 69.

The separating action in the stone section takes place for two reasons: first, the nibs are less conductive than the stones, metals, glass, sand and other particles, and with a potential of eight to fourteen thousand volts, these nibs can be effectively stuck to the ground roll or conveyor and removed from the electrostatic field since they retain their charge, while stones, metallics, sand, glass, etc., are unaffected by this low voltage since they quickly lose their charge and simply fall off the grounded roll or conveyor over a divider which is adjusted to convey these less conductive particles out of the separator to a screw conveyor. It would require a much higher voltage to stick these materials on the grounded eletrodes than it does to stick the nibs. Second, by speeding up the grounded electrodes or conveyors, there is more or less centrifugal action which naturally throws the heavy particles out of the field, overcoming by centrifugal force, to a great extent, the electrostatic sticking action even on particles where the conductivities are fairly close, and in this way a very positive separation of nibs is effected from these impurities, which not only are injurious in a food product such as chocolate liquor or cocoa, but are very destructive to the grinding stones used for reducing these nibs to chocolate liquor.

The speed of the ground rolls and the voltage applied, as well as the divider, can be adjusted so that it is practically impossible for any of these impurities to remain with the nibs, therefore assuring a perfectly clean nib product which, in most cases, is 99.7% pure.

The nibs are directed to the interior of the separator by means of guide chutes 88 and 89, which are adjustably positioned underneath the top two grounded roller electrodes 68 and 69, as illustrated. Adjustable dividers 90 and 91 are provided for separating the stones and metallic particles from the remainder of the product and also for directing it onto the next succeeding grounded roller electrode.

The nibs fall from the guide chutes 88 and 89 into troughs 92 and 93 located at the bottom of the separator. Screw conveyors 94 and 95, mounted on shafts 96 and 97, respectively, are provided for conveying the cleaned nibs to spouts 98 and 99, from which they may be removed for further processing.

The stones, metallic particles, and the like fall into troughs 100 and 101 on opposite sides of the separator, in which troughs are positioned screw conveyors 102 and 103, mounted on shafts 104 and 105, respectively, for carrying the particles therein to spouts 106 and 107 located at the ends thereof. Likewise the shell particles, which have been removed due to the combined action of the electrostatic fields and the air currents, fall into suitable troughs 108 and 109, located along the bottom and the outside of the separator. Screw conveyors 110 and 111, mounted on shafts 112 and 113 serve, when rotated, to carry the shells to spouts 114 and 115 located at the ends of the troughs 108 and 109. In order to catch all of the shells which are extracted, aprons 116 and 117 are provided for forming extensions of the outer lips of the troughs 108 and 109, as illustrated.

Figure 6:
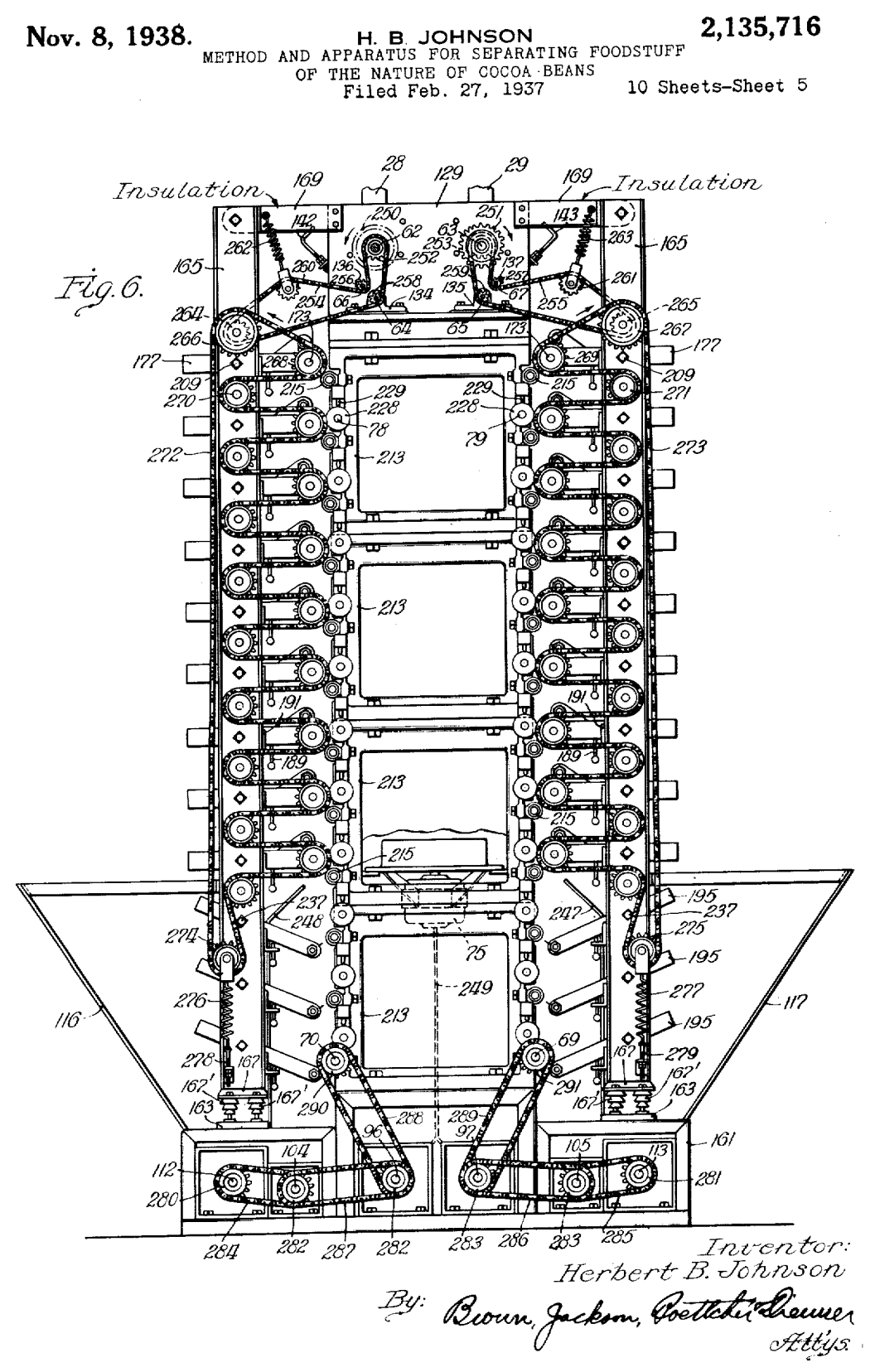

The details of construction of the electro-pneumatic separator will now be set forth. Reference will first be had to Figure 5 of the drawings, showing the separator in side elevation, together with the various enlarged sectional views shown in Figures 8, 9, 10 and 11, which illustrate the various details of construction that cooperate to provide the separating efficiency made possible by my invention. The manner in which the screw conveyors and the roller electrodes are driven will then be described with particular reference to Figures 6 and 7 of the drawings.

Referring now particularly to Figures 5 and 8 of the drawings, it will be observed that the hoppers 56 and 57 are formed by back walls 124 and 125 and front walls 126 and 127. These walls are positioned between hopper end castings 128 and 129, and the lower ends converge inwardly toward the feed rollers 64 and 65, as illustrated. In order to prevent the cracked product from falling back of the feed rollers 64 and 65, felt strips 130 and 131 are secured by means of suitable angles 132 and 133 at the lower ends of the back walls 124 and 125 and in engagement with the feed rollers 64 and 65. The felt strips extend along the entire length of the feed rollers 64 and 65 and, in addition, serve to keep them free from particles that might otherwise adhere thereto.

The feed rollers 64 and 65 are mounted in suitable bearings 134 and 135, which are positioned on the outside of the hopper end castings 128 and 129, as shown. The feed rollers 64 and 65 are positioned at the apex of each of the hoppers 56 and 57 and serve, when rotated in the directions as indicated by the arrows, to feed the cracked product for further processing to the electro-static separator units disposed below.

With a view to movably mounting the distributing rollers 66 and 67, the hopper end castings 128 and 129 are provided with slots 136 and 137 through which the reduced end portions of these rollers project. The slots 136 and 137 serve as guides for the distributing rollers 66 and 67, as well as for limiting the movement thereof. The distributing rollers 66 and 67 are mounted in suitable bearings 138 and 139 which are carried at the ends of distributing roller support angles 140 and 141, as illustrated. The angles 140 and 141 are slidably mounted on adjusting handles 142 and 143 which are positioned in suitable openings in angles 144 and 145, which may be riveted to the under side of the lower inturned portions of the front walls 126 and 127. Compression springs 146 and 147 are positioned around the adjusting handles 142 and 143 and between the angles 140 and 144 and 141 and 145, for biasing the distributing rollers 66 and 67 downwardly toward the feed rollers 64 and 65. The distributing rollers 66 and 67 are arranged to be rotated at such speed relative to the speed of rotation of the feed rollers 64 and 65 that there is a difference in their peripheral speeds. In this manner a certain rubbing or sliding action takes place between these rollers and the particles of cracked product as it is fed therethrough, causing it to be discharged in a thin sheet of substantially uniform thickness.

It will be observed that the troughs 58 and 59, which receive the cracked product from the spouts 28 and 29, are secured in position by support straps 148 and 149 which may be secured thereto as by riveting or the like, and the ends of which are turned outwardly to provide for mounting between the hopper end castings 128 and 129, by bolts or any other suitable means. As has been set forth hereinbefore, it is desirable that no classifying action take place in the troughs 58 and 59. Such action tends to take place, due to the fact that the cracked product is not homogeneous. That is, the shells are lighter than the rest of the product and as a result there is a tendency for the shells to float along the top of the product and to be concentrated at the end away from where it is fed to the screw conveyors 60 and 61. In order to obviate this difficulty, slots 150 and 151 are positioned transversely in the bottom of the troughs 58 and 59, as illustrated, thereby causing the cracked product to be uniformly deposited on the feed and distributing rollers directly below. No classifying action takes place with this construction, and a uniform percentage of shell content is provided throughout the length of the troughs 58 and 59 under all operating conditions. The product, as it is fed from the rollers 64 and 66, and 65 and 67, falls onto chutes 152 and 153, by means of which it is guided to the electro-pneumatic separating unit therebelow.

As shown at the bottom of Figure 5, base assemblies 160 and 161 are provided for supporting the superstructure of the separator. These base assemblies may be formed in any suitable manner, such as by a combination of welded shapes in the form of channel sections, which may be readily constructed to perform the desired supporting functions. Plates 162 and 163 are provided on the base assemblies and extend outwardly therefrom for supporting the high potential roller electrode support channels 164 and 165. Channel legs 166 and 167 are provided at the feet of channels 164 and 165, as illustrated, for supporting them on the plates 162 and 163. Support brackets 168 and 169 are provided at the top ends of the channels 164 and 165 for bracing them against the hopper end castings 128 and 129.

If it is desired to insulate the electrode support channels 164 and 165 from the rest of the machine, the channel legs 166 and 167 may be mounted on porcelain insulators 166' and 167', which may, in turn, be mounted on the plates 162 and 163. The support brackets 168 and 169 at the upper ends of the electrode support channels may be formed of suitable insulating material, or porcelain insulators of the type shown at 166' and 167' may be employed for insulating and supporting these upper ends. This construction provides additional insulation for the high potential roller electrodes 69—70 and the spray discharge electrodes 84—85 from ground.

The manner in which the high potential roller electrodes 71 and the spray discharge electrodes 85 are mounted is shown generally in Figure 5 of the drawings and in detail in Figure 9, which is taken looking outwardly from inside of the right hand end of the separator as viewed in Figure 5. Reference will now be had to these two figures of the drawings, for the purpose of setting forth how these electrodes are insulated from the remaining parts of the separator and the roller electrodes 71 are mounted for rotation.

With a view to insulating the roller electrodes 71 from the remaining parts of the separator, insulators 170 and 171 are provided. It will be understood that a similar arrangement is provided on the back side of the separator for insulating the roller electrodes 70. It will be noted that the electrodes 71 are of tubular construction and that the insulators 170 are provided with reduced end sections for interfitting with the ends of these electrodes. Shaft inserts 172 and 173 are molded into the ends of the insulators 170 and 171 to provide for mounting them in suitable self-aligning bearings 174 and 175.

The inserts 173 are provided with shaft extensions for mounting driving sprockets thereon, as will be set forth hereinafter. The self-aligning bearings 174 and 175 are suitably mounted in high potential roller electrode support arms 176 and 177, which are adjustably mounted on the support channels 164 and 165. The support arms 176 and 177 are provided with flat faced bosses 178 and 179, integrally formed therewith, for mounting insulators 180 and 181 which are employed to support the high potential electrode scrapers 81. Inserts 182 are molded into the insulators 180 and 181 and are arranged to project through suitable openings in the flat faced bosses 178 and 179, the outer ends being threaded for receiving nuts to hold the insulators 180 and 181 in position. Additional inserts 183 are molded in the opposite ends of the insulators 180 and 181 for supporting hanger brackets 184 and 185 that serve to support the scrapers 81, as will be described hereinafter. Connector straps 186 and 187 are provided at opposite ends of the high potential roller electrodes 71 between the inserts 183, thereby connecting all of the electrodes 71 in parallel circuit relation. The connector straps 186 and 187 may be formed of thin strips of brass having resilient characteristics for securing the necessary contact and permitting relative adjustment of the support arms 176 and 177 to locate the roller electrodes 71 at the desired positions.

The support arms 176 and 177 may be adjusted to different positions by means of adjusting screws 188 and 189, (Figure 10), which are threadably mounted in adjusting screw brackets 190 and 191, (Figure 10). The brackets 190 and 191 are mounted on the channels 164 and 165 by any suitable means, such as bolts.

The spray discharge electrodes are stationarily mounted on insulators 192 and 193, which are carried by support arms 194 and 195 that are adjustably mounted on the channels 164 and 165. Adjusting screws 196 and 197, (Figure 11), threaded in adjusting screw brackets 198 and 199, (Figure 11), mounted on the channels 164 and 165, are provided for adjusting the spray discharge electrodes 87 in the desired positions. Connecting straps 200 and 201, similar to connecting straps 186 and 187, are provided at opposite ends of the spray discharge electrodes 85 for interconnecting them in parallel circuit relation.

The arrangement of the electrodes 68 and 70 and the cooperating parts is illustrated more clearly in Figure 10 of the drawings. This view is taken on the back side of the separator as viewed in Figure 5, the section being taken looking to the left. The driving chains have been omitted in order to avoid confusion.

As illustrated in Figure 10, the support arms 177 are provided with slots 208 through which bolts 209 project. The bolts 209 extend through the channel 165 and serve to hold the support arms 177 in position. When the nuts of the bolts 209 are loosened the support arms 177 may be moved within the confines of the slots 208 and may be rotated about the bolts 209, depending upon the adjustment of the adjusting screws 189. It will be observed that the arrangement of a high potential roller electrode 70 and the cooperating scraper 80 and felt wiper 82 on each of the support arms 177 provides a unitary construction which permits ready adjustment with respect to the corresponding grounded roller electrode 68 and at the same time that it simplifies the insulation problem. When it is realized that a potential of several thousand volts is maintained between the electrodes 68 and 70, it will be easily appreciated that the provision of suitable insulation is of great importance.

The scraper 80 and the cooperating felt wiper 82 are held in position for engaging the roller electrodes 70 by means of Z-shaped angles 210 and supporting strips 211 carried by the hanger brackets 184 and 185. With this construction it is unnecessary to separately adjust the scraper 80 and the felt wiper 82 for different positions of the high potential roller electrodes 70 when once the necessary adjustments have been made. The angle 210 may be secured by spot welding to the support strip 211, and it may be secured, by screws or otherwise, to the hanger brackets 184 and 185.

Referring briefly to the left and right-hand end views of the separator as illustrated in Figures 6 and 7 of the drawings, respectively, it will be observed that the frame end castings 212 and 213 are mounted one above the other on the base assemblies 160 and 161 to form the principal support for the grounded roller electrodes 68 and 69 and the associated chutes 72 and 73 and dividers 76 and 77. These frame end castings may be secured together by bolting or otherwise. In this manner a larger or a smaller number of units for the pulling section may be provided, as may be desired. It will also be observed that self-aligning bearings 214 and 215 are provided in the frame end castings 212 and 213, respectively, for mounting the grounded roller electrodes 68 and 69.

Referring again to the sectional view shown in Figure 10 of the drawings, it will be noted that the frame end casting 213 there illustrated is provided with inwardly extending projections 216, on which transverse angles 217 are positioned. The angles 217 extend along the entire length of the grounded roller electrodes 68 and they provide pockets at the back thereof into which the product to be processed may be fed from the unit immediately above. The ends of the angles 217 adjacent the roller electrodes 68 are machined to provide a close fit therebetween. Suitable bolts may be provided for securing the angles 217 in position.

The grounded roller electrode chutes 72 comprise upper and lower chute members 218 and 219, which may be provided with openings 220 and 221, respectively, to provide for the passage of air from the inside of the separator into the product stream as it falls between and over the electrodes 68 and 70, for assisting in removing the lighter shell particles. The chute members 218 and 219 may be formed of relatively thin sheet steel and may be secured together, and to the angles 217, by spot welding.

It will be observed that the outer ends of the upper chute members 218 are turned upwardly to provide scraping engagement with the surfaces of the grounded roller electrodes 68 as they are rotated in the direction indicated by the arrows. By means of these upturned ends 222 the cracked product, as it is fed over the grounded roller electrodes 68 of the pulling section, is turned over continuously, so that the shell particles therein may be more readily subjected to the influence of the electrostatic field maintained between the electrodes 68 and 70. It will then be apparent that the chances that some of the shell particles will not have been presented most advantageously to the effects of the electrostatic fields are relatively slight, particularly when a comparatively large number of pairs of electrodes are employed in the pulling section. This turning action is highly important since, without it, it is entirely possible that a large percentage of the remaining shell particles would not be affected by the attractive force of the electro-static fields and therefore they would not be removed therefrom.

This same turning action may also be effected by the provision of an auxiliary grounded roller electrodes 68', Figure 12 of considerably smaller diameter than the grounded roller electrodes 68. The smaller electrode 68' would be arranged to rotate in the same direction as the larger electrode 68 and in as close proximity thereto as is mechanically possible. The smaller electrode 68' would be positioned in substantially the same location as the upturned end 222 of the upper chute member 218. This arrangement would retard the velocity at which the product flows over the grounded electrodes 68 and would permit a slightly longer time of exposure of the shell particles to the electro-static field.

The dividers 76 are provided in the product stream as it flows from one pair of electrodes to the next, and they are arranged to be adjustably positioned so that the most advantageous locations may be selected, with a view to permitting a minimum waste of the nibs, which might otherwise be discarded with the shell particles. Each of the dividers 76 comprises an upper and lower divider member 223 and 224, which may be formed of relatively thin sheet steel. Bolts 225 may be provided in slotted openings in the members 223 and 224 for securing them together, the slots being provided to permit some adjustment in the width of the divider assembly. The dividers 76 may be adjusted by means of brackets 226 that are carried by the shafts 78 which extend through the frame end castings 212 and 213, as illustrated. The lower ends of the dividers 76 are positioned in notched divider support members 227 that are carried by the end castings 212 and 213. The dividers 76 may be positioned in either of the notches of the support members 227, as may be desired, depending upon the operating conditions which are encountered. At one end of each of the shafts 78 a ratchet wheel 228 is provided to permit the desired adjustment of the dividers 76. Suitable holding means such as spring pressed pawls 229 are provided for the ratchet wheels 228.

The arrangement of the lower two pairs of electrodes of the stone section is shown in Figure 11 of the drawings. This view is taken with respect to Figure 5 in the same manner as Figure 10 is taken. The top grounded roller electrode 68 of this section, and the details for mounting the fans 74 and the driving motors 75 therefor, are not shown or described herein. It will be understood that any suitable means may be provided for mounting this apparatus.

As shown in Figure 11, the support arms 195 for the spray discharge electrodes 84 are provided with slots 236 through which bolts 237 project. The bolts 237 extend through the channels 165 and when loosened permit a certain range of movement of the support arms 195, as will be readily understood. Adjusting screws 197 are provided, as set forth hereinbefore, for assisting in making the necessary adjustments.

The end casting 213 is provided with the inwardly extending projections 216, as described hereinbefore, on which angles 238 may be positioned, having extensions 239, formed of thin sheet steel, extending upwardly therefrom as illustrated. The angles 238 extend transversely through the separator along the grounded roller electrodes 68 to cooperate therewith in forming a pocket into which the product being processed may be fed. The dividers 90 are mounted on suitable brackets 240, which are carried by the shafts 78 and are adjustable therewith by means of the ratchet wheels 228. The guide chutes 88, formed preferably of sheet steel, are mounted on suitable transverse angles 241 which, in turn, are carried by threaded holders 242. Adjusting screws 243, rotatably mounted in adjusting screw blocks 244, afford adjustment of the guide chutes 88 in a horizontal plane. Grooves 245 are provided near the adjusting ends of the screws 243, into which grooves the ends of screws 246 project. In this manner the adjusting screws 243 are prevented from moving transversely relative to the block 244, but they are still free to rotate to effect the desired adjustment of the holders 242 and the guide chutes 88 carried thereby.

Referring now particularly to the left-hand end view illustrated in Figure 6 of the drawings, it will be observed that product separating walls 247 and 248 are provided outside of the spray discharge electrodes 84 and 85, to provide a suitable guide for the shell particles as they fall from the pulling section above. In addition, a product separating wall 249 is provided directly underneath the motors 75, to separate the two sizes of nibs as they come from the stone section.

It will be understood that any suitable arrangement may be employed for driving the various rotating parts of the separator. A single motor or a plurality of motors may be employed. However, for the purposes of illustrating the invention, a simplified driving arrangement is shown in the drawings. Accordingly, driven sprockets 250 and 251 may be mounted for rotation with the shafts 62 and 63 of the product conveyors 60 and 61 in the hoppers 56 and 57. Individual electric motors may be connected to drive these sprockets, or a single motor may be used, with appropriate interconnections for effecting the rotation of the sprockets 250 and 251 in the direction of the arrows. Drive sprockets 252 and 253 are also provided on the shafts 62 and 63. Drive chains 254 and 255 pass over the sprockets 252 and 253 and underneath drive sprockets 256 and 257 on the distributing rollers 66 and 67, and also underneath drive sprockets 258 and 259 on feed rollers 64 and 65. The chains 254 and 255 pass over idler sprockets 260 and 261, supported in such manner as to hold these chains tight by means of tension springs 262 and 263. These chains 254 and 255 also pass over small driven sprockets 264 and 265, with which large drive sprockets 266 and 267 are mounted for rotation. It will be recalled that the distributing rollers 66 and 67 are resiliently mounted at the bottoms of the hoppers 56 and 57, in order to permit passage therefrom of relatively large particles of the cracked product which may not previously have been properly separated out. For this purpose, the idler sprockets 260 and 261 are resiliently mounted, as will be readily understood. Drive sprockets 268 and 269 are provided on the inserts 173 of the high potential roller electrodes 70 and 71 to permit rotation thereof. Idler sprockets 270 and 271 are mounted along the channels 165, and drive chains 272 and 273, passing over the large drive sprockets 266 and 267 and around the sprockets 268, 269, 270 and 271, serve to effect rotation of the electrodes 70 and 71 in the desired manner. It will be noted that the chains 272 and 273 pass underneath movably mounted sprockets 274 and 275, to which tension springs 276 and 277 are connected and arranged for adjustment by means of eyebolts 278 and 279. Since the high potential roller electrodes 70 and 71 are adjustably mounted, some such driving arrangement as illustrated in Figure 6 and described hereinbefore is necessary, in order to permit wide latitude in adjustment while rendering unnecessary any changes in the driving mechanism. The shafts 112 and 113 of the product conveyors at the bottom of the separator are provided with single sprockets 280 and 281, while double sprockets 282 and 283 are mounted on the shafts 104 and 96 and on shafts 97 and 105. Drive chains 284, 285 and 286, 287 serve to interconnect these sprockets as illustrated. Additional drive chains 288 and 289, arranged to be driven by sprockets 290 and 291 on the bottom pair of grounded roller electrodes 69 and 70, serve to transmit the required driving force to the product conveyors. The grounded roller electrodes 69 and 70 are arranged to be driven from the other end of the separator, as will be set forth hereinafter.

A suitable arrangement for driving the grounded roller electrodes 68 and 69 is illustrated more clearly in Figure 7 of the drawings, which shows the right-hand end of the separator. As there shown, drive sprockets 298 and 299 are provided on the feed rollers 64 and 65, having chains 300 and 301 passed thereover for driving double sprockets 302 and 303 mounted for rotation with the ends of the roller electrodes 68 and 69. Chains 304 and 305 serve to interconnect the double sprockets 302 and 303 as illustrated. It will be recalled that the speed of the grounded roller electrodes 68 and 69 in the stone section is higher than the speed thereof in the pulling section, in order to take advantage of the effects of centrifugal force in separating the stones, metallic particles, and the like, from the nibs. For this purpose, large drive sprockets 306 and 307 are provided on the bottom grounded roller electrodes of the pulling section and have chains 308 and 309 passing thereover for driving the electrodes 68 and 69 of the lower section.

Since certain further changes may be made in the above constructions, and different embodiments of the invention may be made without departing from the scope thereof, it is intended that all matters contained in the above description or shown in the accompanying drawings shall be interpreted as illustrative, and not in a limiting sense.

I claim as my invention:—

1. The method of processing foodstuff of the nature of cocoa beans, which comprises humidifying the whole beans, cracking the beans to permit separation of the combined shell and nib product, sorting the product according to size, passing an air current through the combined product to remove a portion of the shells, scrubbing the air current to remove a portion of the nibs, allowing the air current to expand to remove a further portion of the nibs, uniformly subjecting the remaining shell and nib product to the successive action of a plurality of electro-static fields for removing the remaining shell portion, turning the product over while subjected to said fields, and subjecting the product to a series of electro-static discharges for removing extraneous particles therefrom.

2. The method of processing foodstuff of the nature of cocoa beans, which comprises cracking the beans to permit separation of the combined shell and nib product, sorting the product according to size, passing a humidified air current through the combined product to remove a portion of the shells and increase the conductivity of the remaining portion, scrubbing the air current to remove a portion of the nibs, allowing the air current to expand to remove a further portion of the nibs, uniformly subjecting the remaining shell and nib product to the successive action of a plurality of electro-static fields for removing the remaining shell portion, turning the product over while subjected to said fields, and subjecting the product to a series of electro-static discharges for removing extraneous particles therefrom.

3. In an electro-static separator for separating a product comprising mixed particles, in combination, a cylindrical rotatable electrode forming one electrode of a pair of electrodes disposed to be connected across a high potential direct current source and arranged to receive said product thereon, and scraper means disposed in the electrostatic field between said electrodes to cooperate with said rotatable electrode for turning over said product to move effectively subject it to the influence of the electro-static field between said electrodes.

4. In an electro-static separator for separating a product comprising mixed particles, in combination, a cylindrical rotatable high potential electrode forming one electrode of a pair of electrodes disposed to be connected across a high potential direct current source for attracting one portion of said product, scraper means cooperating with said high potential electrode to remove therefrom particles of said one portion, and abrasive wiper means also cooperating with said high potential electrode for polishing the surface thereof and continuously maintaining said surface smooth to prevent the formation of substantially any discharge points thereon.

5. In an electro-static separator for separating a product comprising mixed particles, in combination, a pair of rotatable cylindrical electrodes disposed in insulated spaced relation for connection across a high potential direct current source, one of said electrodes being positioned to receive said product thereon, means for rotating said electrodes in the same direction, and scraper means disposed in the electro-static field between said electrodes to cooperate with said one electrode for turning over said product to more effectively subject it to the influence of the electro-static field between said electrodes.

6. In an electro-static separator for separating a product comprising mixed particles, in combination, a pair of rotatable cylindrical electrodes disposed in insulated spaced relation for connection across a high potential direct current source, one of said electrodes being positioned to receive said product thereon, means for rotating said electrodes in the same direction, scraper means disposed in the electro-static field between said electrodes to cooperate with said one electrode for turning over said product to more effectively subject it to the influence of the electro-static field between said electrodes, additional scraper means cooperating with the other of said pair of electrodes for removing therefrom particles, and abrasive wiper means cooperating with said other electrode for polishing the surface thereof.

7. In an electro-static separator for separating a product comprising mixed particles, in combination, a cylindrical rotatable electrode forming one electrode of a pair of electrodes disposed to be connected across a high potential direct current source and arranged to receive said product thereon, and means including an auxiliary roller disposed in the electro-static field between said electrodes and having a diameter substantially less than that of said grounded electrode and cooperating with the same to turn over said product to more effectively subject it to the influence of the electro-static field between said electrodes.

8. In an electro-static separator for separating a product comprising mixed particles, in combination, a pair of rotatable cylindrical electrodes disposed in insulated spaced relation for connection across a high direct voltage source, one of said electrodes being positioned to receive said product thereon, and abrasive wiper means cooperating with the other of said pair of electrodes for polishing its surface and maintaining the same smooth to prevent the formation of substantially any discharge points thereon.

9. In an electro-static separator for separating a product comprising mixed particles, in combination, a pair of rotatable cylindrical electrodes disposed in insulated spaced relation for connection across a high direct voltage source, one of said electrodes being positioned to receive said product thereon, means for rotating said electrodes in the same direction, and abrasive wiper means cooperating with the other of said pair of electrodes for polishing its surface and maintaining the same smooth to prevent the formation of substantially any discharge points thereon.

10. In an electro-static separator for separating a product comprising mixed particles, in combination, a pair of electrodes disposed in insulated spaced relation for connection across a high direct voltage source, one of said electrodes being positioned to receive said product thereon and the other being of cylindrical shape and rotatably mounted, means for rotating said other electrode, and abrasive wiper means extending longitudinally of said other electrode and bearing against the same for polishing its surface and maintaining the same smooth to prevent the formation of substantially any discharge points thereon.

HERBERT B. JOHNSON.

CERTIFICATE OF CORRECTION.

Patent No. 2,135,716.   November 8, 1938.

HERBERT B. JOHNSON.

It is hereby certified that error appears in the printed specification of the above numbered patent requiring correction as follows: Page 11, second column, line 21, claim 3, for the word "move" read more; and that the said Letters Patent should be read with this correction therein that the same may conform to the record of the case in the Patent Office.

Signed and sealed this 27th day of December, A. D. 1938.

Henry Van Arsdale (Seal)   Acting Commissioner of Patents.

disposed in the electro-static field between said electrodes and having a diameter substantially less than that of said grounded electrode and cooperating with the same to turn over said product to more effectively subject it to the influence of the electro-static field between said electrodes.

8. In an electro-static separator for separating a product comprising mixed particles, in combination, a pair of rotatable cylindrical electrodes disposed in insulated spaced relation for connection across a high direct voltage source, one of said electrodes being positioned to receive said product thereon, and abrasive wiper means cooperating with the other of said pair of electrodes for polishing its surface and maintaining the same smooth to prevent the formation of substantially any discharge points thereon.

9. In an electro-static separator for separating a product comprising mixed particles, in combination, a pair of rotatable cylindrical electrodes disposed in insulated spaced relation for connection across a high direct voltage source, one of said electrodes being positioned to receive said product thereon, means for rotating said electrodes in the same direction, and abrasive wiper means cooperating with the other of said pair of electrodes for polishing its surface and maintaining the same smooth to prevent the formation of substantially any discharge points thereon.

10. In an electro-static separator for separating a product comprising mixed particles, in combination, a pair of electrodes disposed in insulated spaced relation for connection across a high direct voltage source, one of said electrodes being positioned to receive said product thereon and the other being of cylindrical shape and rotatably mounted, means for rotating said other electrode, and abrasive wiper means extending longitudinally of said other electrode and bearing against the same for polishing its surface and maintaining the same smooth to prevent the formation of substantially any discharge points thereon.

HERBERT B. JOHNSON.

CERTIFICATE OF CORRECTION.

Patent No. 2,135,716.     November 8, 1938.

HERBERT B. JOHNSON.

It is hereby certified that error appears in the printed specification of the above numbered patent requiring correction as follows: Page 11, second column, line 21, claim 3, for the word "move" read more; and that the said Letters Patent should be read with this correction therein that the same may conform to the record of the case in the Patent Office.

Signed and sealed this 27th day of December, A. D. 1938.

Henry Van Arsdale (Seal)     Acting Commissioner of Patents.